US011063629B1

(12) United States Patent
Bhupatiraju et al.

(10) Patent No.: US 11,063,629 B1
(45) Date of Patent: Jul. 13, 2021

(54) TECHNIQUES FOR DETECTING WIRELESS COMMUNICATIONS INTERFERENCE FROM A WIRED COMMUNICATIONS CHANNEL

(71) Applicant: NVIDIA CORPORATION, Santa Clara, CA (US)

(72) Inventors: Srirama Bhupatiraju, San Jose, CA (US); Tom Winton, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/070,688

(22) Filed: Oct. 14, 2020

(51) Int. Cl.
*H04B 3/46* (2015.01)
*H04B 17/364* (2015.01)
*H04B 17/345* (2015.01)
*H04B 17/336* (2015.01)

(52) U.S. Cl.
CPC ............ *H04B 3/46* (2013.01); *H04B 17/336* (2015.01); *H04B 17/345* (2015.01); *H04B 17/364* (2015.01)

(58) Field of Classification Search
CPC ...... H04B 3/46; H04B 17/336; H04B 17/345; H04B 17/364; H04B 3/00; H04B 3/02; H04B 3/487; H04B 3/493; H04B 5/00; H04B 5/0018; H04B 17/00; H04B 17/30
See application file for complete search history.

(56) References Cited

U.S. PATENT DOCUMENTS

| 5,995,567 | A | * | 11/1999 | Cioffi | H04B 1/123 375/346 |
| 6,625,454 | B1 | * | 9/2003 | Rappaport | H04W 16/20 455/422.1 |
| 7,443,389 | B1 | * | 10/2008 | Alben | G09G 5/363 345/204 |
| 7,558,348 | B1 | * | 7/2009 | Liu | H04B 1/40 327/310 |
| 8,021,193 | B1 | * | 9/2011 | Jatou | H01R 31/065 439/638 |
| 8,021,194 | B2 | * | 9/2011 | Jatou | H01R 31/065 439/638 |
| 8,126,402 | B1 | * | 2/2012 | Jatou | H03H 7/427 455/63.1 |
| 8,611,437 | B2 | * | 12/2013 | Poulton | H04L 25/028 375/257 |

(Continued)

*Primary Examiner* — James M Perez
(74) *Attorney, Agent, or Firm* — Artegis Law Group, LLP

(57) ABSTRACT

Various embodiments include techniques for detecting a poor-quality cable associated with a wired communications channel that is causing noise that interferes with a wireless communications channel. The techniques are directed towards a test that a processor performs when the cable is installed in a user system. A wireless test application, executing on one or more processors of the system, determines a noise floor for the wireless communications channel when the wired communications channel is disabled. The wireless test application determines the noise power for the wireless communications channel when the wired communications channel is enabled, thereby causing interference in the wireless communications channel. The wireless test application compares the noise power to the noise floor in order to determine whether the cable is a high-quality cable or a low-quality cable.

20 Claims, 9 Drawing Sheets

(56) References Cited

U.S. PATENT DOCUMENTS

| | | | | |
|---|---|---|---|---|
| 8,761,350 B2* | 6/2014 | Faulkner | | H04L 43/50 379/22.03 |
| 8,995,594 B2* | 3/2015 | Kesling | | H04L 27/06 375/350 |
| 9,065,530 B2* | 6/2015 | Aymes | | H04B 17/21 |
| 9,071,244 B2* | 6/2015 | Poulton | | H04L 25/0274 |
| 9,226,311 B2* | 12/2015 | Thoukydides | | H04B 1/406 |
| 9,337,886 B1* | 5/2016 | Dick | | H04B 1/0475 |
| 9,338,036 B2* | 5/2016 | Poulton | | H04L 25/0272 |
| 9,692,630 B2* | 6/2017 | Qi | | H04L 1/007 |
| 9,807,646 B1* | 10/2017 | Jorgavanovic | | H04L 1/20 |
| 10,032,710 B2* | 7/2018 | Hwang | | H01L 23/485 |
| 10,063,369 B1* | 8/2018 | Murphy | | G01D 21/02 |
| 10,469,109 B2* | 11/2019 | Gutman | | H03F 3/24 |
| 10,633,246 B2* | 4/2020 | Kaija | | B81B 7/0064 |
| 10,916,841 B2* | 2/2021 | Ravichandran | | H01Q 1/521 |
| 2004/0208350 A1* | 10/2004 | Rea | | G01M 11/00 382/128 |
| 2008/0291989 A1* | 11/2008 | Ashikhmin | | H04B 3/487 375/224 |
| 2008/0299965 A1* | 12/2008 | Lagerman | | H04K 3/84 455/431 |
| 2009/0059780 A1* | 3/2009 | De Lind Van Wijngaarden | | H04B 3/32 370/201 |
| 2009/0245081 A1* | 10/2009 | Ashikhmin | | H04M 3/18 370/201 |
| 2010/0296555 A1* | 11/2010 | Cahill | | H04L 1/0001 375/219 |
| 2012/0099629 A1* | 4/2012 | Faulkner | | H04M 3/306 375/222 |
| 2012/0179812 A1* | 7/2012 | Keller, III | | G01S 5/02 709/224 |
| 2012/0306895 A1* | 12/2012 | Faulkner | | H04M 3/306 345/501 |
| 2012/0307982 A1* | 12/2012 | Faulkner | | H04B 3/46 379/27.01 |
| 2012/0307983 A1* | 12/2012 | Faulkner | | H04L 41/0677 379/29.03 |
| 2013/0049786 A1* | 2/2013 | El-Hassan | | H04B 17/0085 324/756.01 |
| 2013/0194031 A1* | 8/2013 | Poulton | | H04L 25/0272 327/536 |
| 2013/0195165 A1* | 8/2013 | Poulton | | H04L 25/0274 375/229 |
| 2013/0316750 A1* | 11/2013 | Couch | | H04L 41/0618 455/501 |
| 2014/0044159 A1* | 2/2014 | Poulton | | H04L 25/028 375/229 |
| 2015/0133185 A1* | 5/2015 | Chen | | H04W 72/1215 455/552.1 |
| 2015/0134863 A1* | 5/2015 | Hsieh | | H04W 52/0203 710/106 |
| 2015/0181442 A1* | 6/2015 | Zinevich | | H04B 17/318 455/424 |
| 2015/0215950 A1* | 7/2015 | Amini | | H04W 52/0212 370/252 |
| 2016/0080031 A1* | 3/2016 | Kassel | | H04B 3/238 379/406.06 |
| 2016/0198482 A1* | 7/2016 | Kimura | | H04W 72/0406 370/329 |
| 2017/0046302 A1* | 2/2017 | Chen | | G06F 13/409 |
| 2017/0364401 A1* | 12/2017 | Huang | | G06F 11/0748 |
| 2018/0033764 A1* | 2/2018 | Huang | | H01L 23/552 |
| 2018/0294909 A1* | 10/2018 | Trojer | | H04L 27/2607 |
| 2020/0096550 A1* | 3/2020 | Goergen | | G01R 31/58 |
| 2020/0319306 A1* | 10/2020 | Kim | | H05K 9/0058 |
| 2020/0411979 A1* | 12/2020 | Ravichandran | | H04B 1/0475 |

* cited by examiner

TECHNIQUES FOR DETECTING WIRELESS COMMUNICATIONS INTERFERENCE FROM A WIRED COMMUNICATIONS CHANNEL

BACKGROUND

Field of the Various Embodiments

Various embodiments relate generally to computer processing architectures, more specifically, to techniques for detecting wireless communications interference from a wired communications channel.

Description of the Related Art

Modern computer-based systems, such as, personal computers, set top boxes, gaming systems, laptop computers, and/or the like, typically include multiple wired and wireless communications channels. Such computer-based systems transmit data to and receive data from, other computer-based systems via these wired and wireless communications channels. In general, different communications channels are designed to not interfere with each other. In that regard, different wireless communications channels may operate in different frequency bands. As a result, data exchanged between computer-based systems via one communications channel operating in one frequency band do not interfere with data exchanged between computer-based systems via another communications channel operating in another frequency band. Further, wired communications channels include cables that physically connect two or more computer-based systems together to communicate with one another via these cables. As a result, data exchanged between computer-based systems via one communications channel over a first set of cables does not interfere with data exchanged between computer-based systems via another communications channel over a second set of cables.

However, under certain circumstances, one communications channel can interfere with another communications channel. In one particular example, one computer-based system can communicate with another computer-based system via a wired communications channel and, in addition, via a wireless communications channel. If the cable associated with the wired communications channel is of poor construction or is damaged, data transmitted over the wired communications channel may generate radiated emissions in the form of radio frequency (RF) noise that interferes with data transmitted over the wireless communications channel. For example, if the data rate of the data transmitted over the cable is 6 gigabits per second (Gbps), then a poorly constructed or damaged cable may generate RF noise in the range of 6 gigahertz (GHz). If the wireless communications channel operates in the 6 GHz frequency range, then the 6 GHz RF noise generated by the poorly constructed or damaged cable may interfere with data transmitted over the wireless communications channel. As a result, data transmitted by one computer-based system over the wireless communications channel may need to be retransmitted multiple times until the data is successfully received by the receiving computer-based system. Under more extreme circumstances, the data may be corrupted or lost, such that the receiving computer-based system may not be able to receive the originally transmitted data.

One technique for identifying a poorly constructed or damaged cable is to disassemble the cable to determine the integrity of any metal sheathing that surrounds the connectors at the ends of the cable, metal sheathing that surrounds the wires that transmit data along the length of the cable, and the connection between these two types of metal sheathing. Openings in the metal sheathing or in the connection between different types of metal sheathing may result in the transmission of RF noise from the data transmitted via the wires in the cable. One drawback with this technique is that the disassembly of the cable is generally destructive, rendering the cable unfit for use. As a result, this technique is useful for testing a sample of cables from a manufacturing process. However, this technique is not useful for testing a cable at the point of use.

Another technique for identifying a poorly constructed or damaged cable is to test the cable with test equipment, such as a time-domain reflectometer (TDR), a spectrum analyzer, and/or the like. During such testing, signals are transmitted along the wires of the cable at various frequencies, and the effect of those signals is measured when the signal reaches the opposite end of the cable and/or when the signal is reflected back to the point of origin of the signal. By examining, via a TDR and spectrum analyzer, the waveforms of the transmitted signal and/or the reflected signal, an engineer or technician is able to determine whether the cable is of poor quality or has been damaged. While this technique is non-destructive, this technique requires the use of expensive, specialized test equipment, and an engineer or technician with the training and skills to properly use such test equipment. As a result, this technique is useful for testing cables in an engineering laboratory or other technical facility. However, this technique is also not useful for testing a cable at the point of use.

As the foregoing illustrates, what is needed in the art are techniques for readily identifying poorly constructed or damaged cables in computer-based systems at the point of use.

SUMMARY

Various embodiments of the present disclosure set forth a computer-implemented method for detecting wireless communications interference from a wired communications channel. The method includes determining a noise floor associated with a wireless communications channel. The method further includes determining a noise power based on radiated emissions from the wired communications channel that interfere with the wireless communications channel. The method further includes comparing the noise power with the noise level to generate a comparison. The method further includes classifying a cable associated with the wired communications channel based on the comparison.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, with the disclosed techniques, a cable can be tested at the point of use without destroying the cable. In addition, a cable can be tested without the use of expensive, specialized test equipment and without needing special training or skills in the operation of such test equipment. Instead, an unsophisticated user can test a cable by executing a simple test process while the cable is installed. As a result, a user can readily identify whether a cable is causing interference with a wireless communications channel and, in response, take appropriate action. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

As described herein, a wireless test application executing on one or more processors performs a test to determine whether a cable associated with a wired communications channel is generating radiated emissions that cause interference on a wireless communications channel. The radiated emissions may result from a low-quality cable that may have little or no shielding and/or a cable that has been damaged. The wireless test application performs the test while the cable is installed in the end user system. In a first phase of the test, the wireless test application disables the wired interface in order to measure the noise floor. In general, the noise floor is a measure of the cumulative effect of the amplitude of all noise sources and other unwanted signals in the environment, not including the signal being measured. In the disclosed techniques, the noise floor is exclusive of the noise source under test, namely, the radiated emissions from a cable associated with a particular wired communications channel. The wireless test application sets the wireless interface in monitoring mode in order to collect digitized waveform samples from the wireless communications channel. The wireless test application then collects waveform samples over a specified frequency range and converts the waveform samples in the time domain into a frequency spectrum in the frequency domain. The wireless test application repeats the collection of samples and conversion to a frequency spectrum for a predetermined number of passes. The wireless test application then determines the noise floor based on an average of the several passes.

In a second phase of the test, the wireless test application enables the wired interface in order to measure the noise power, including the noise floor plus the radiated emission from the cable. The wireless test application then collects waveform samples over the specified frequency range and converts the waveform samples in the time domain into a frequency spectrum in the frequency domain. The wireless test application repeats the collection of samples and conversion to a frequency spectrum for a predetermined number of passes. The wireless test application then determines the noise power based on an average of the several passes. If the noise power does not exceed the noise floor by more than a threshold amount, then the wireless test application determines that the cable passed the test. If, however, the noise power exceeds the noise floor by more than the threshold amount, then the wireless test application determines that the cable failed the test.

System Overview

Figure 1:
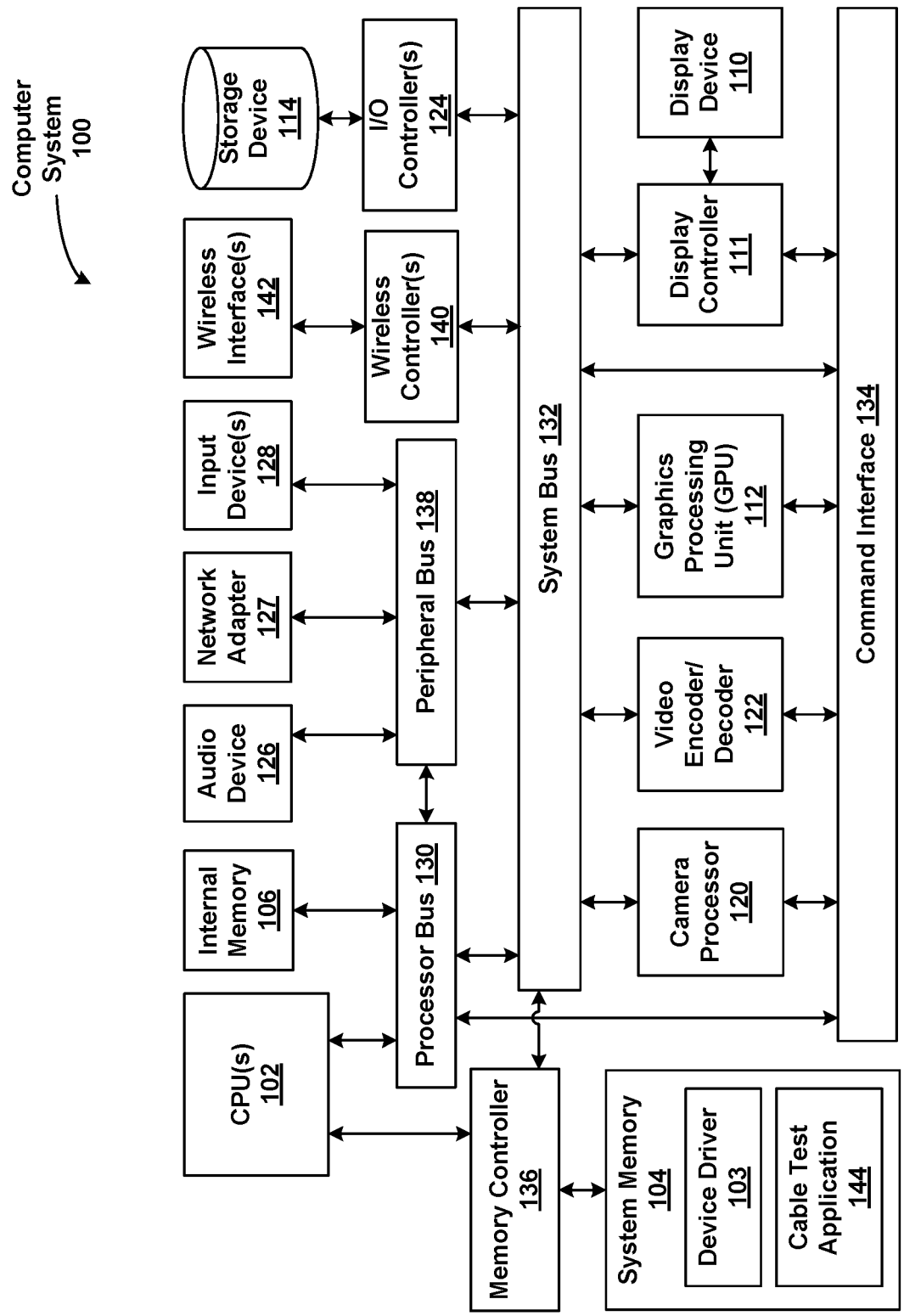
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, one or more central processing units (CPUs) 102 coupled to a system memory 104 via a memory controller 136. The CPU(s) 102 may further be coupled to internal memory 106 via a processor bus 130. The CPU(s) 102 are included to be representative of a single CPU, multiple CPUs, a single CPU having multiple processing cores, one or more digital signal processors (DSPs), one or more field-programmable gate arrays (FPGAs), one or more graphics processing units (GPUs), one or more tensor processing units, and/or the like. The internal memory 106 may include internal read-only memory (IROM) and/or internal random-access memory (IRAM). The computer system 100 further includes a processor bus 130, a system bus 132, a command interface 134, and a peripheral bus 138. The system bus 132 is coupled to a camera processor 120, a video encoder/decoder 122, a graphics processing unit (GPU) 112, a display controller 111, a processor bus 130, a memory controller 136, and a peripheral bus 138. The system bus 132 is further coupled to wireless interface(s) 142 via wireless controller(s) 140. The system bus 132 is further coupled to a storage device 114 via I/O controller(s) 124. The peripheral bus 138 is coupled to an audio device 126, a network adapter 127, and input device(s) 128.

In operation, the CPU(s) 102 are configured to transmit and receive memory traffic via the memory controller 136. The CPU(s) 102 are also configured to transmit and receive I/O traffic and communicate with devices connected to the system bus 132, the command interface 134, and the peripheral bus 138 via the processor bus 130. For example, the CPU(s) 102 may write commands directly to devices via the processor bus 130. Additionally, the CPU(s) 102 may write command buffers to system memory 104. The command interface 134 may then read the command buffers from system memory 104 and write the commands to the devices (such as the camera processor 120, the GPU 112, and/or the like). The command interface 134 may further provide synchronization for devices to which the command interface 134 is coupled.

The system bus 132 includes a high-bandwidth bus to which direct-memory clients may be coupled. For example, the I/O controller(s) 124 coupled to the system bus 132 may include high-bandwidth clients such as Universal Serial Bus (USB) 2.0/3.0 controllers, flash memory controllers, and/or the like. The system bus 132 also may be coupled to middle-tier clients. For example, the I/O controller(s) 124 may include middle-tier clients such as USB 1.x controllers, multi-media card controllers, Mobile Industry Processor Interface (MIPI®) controllers, universal asynchronous receiver/transmitter (UART) controllers, and/or the like. As shown, the storage device 114 may be coupled to the system bus 132 via the I/O controller(s) 124. The storage device 114 may be configured to store content and applications and data for use by the CPU(s) 102, the GPU 112, the camera processor 120, and/or the like. As a general matter, the storage device 114 provides non-volatile storage for applications and data and may include fixed or removable hard disk drives, flash memory devices, and CD-ROM (compact disc read-only-memory), DVD-ROM (digital versatile disc-ROM), Blu-ray, and/or other magnetic, optical, and/or solid state storage devices.

Further, the wireless controller(s) 140 coupled to the system bus 132 may include various wireless clients such as wireless fidelity (WiFi) controllers, Bluetooth controllers, mobile broadband controllers, and/or the like. As shown, the wireless controller(s) 140 may be coupled to corresponding wireless interface(s) 142. The wireless interface(s) 142 may be configured to receive data from the wireless controller(s) 140 and prepare the data for transmission over one or more wireless communications channels, such as by modulating the data onto a carrier wave. Likewise, the wireless interface(s) 142 may be configured to receive signals from one or more wireless communications channels and extract the data therein, such as by demodulating the data that has been previously modulated onto a carrier wave. The wireless interface(s) 142 may then transmit the extracted data to the wireless controller(s) 140.

The peripheral bus 138 may be coupled to low-bandwidth clients. For example, the input device(s) 128 coupled to the peripheral bus 138 may include touch screen devices, keyboard devices, sensor devices, and/or the like that are configured to receive information (such as user input information, location information, orientation information, and/or the like). The input device(s) 128 may be coupled to the peripheral bus 138 via a serial peripheral interface (SPI), inter-integrated circuit (I2C), and/or the like.

In various embodiments, the system bus 132 may include an AMBA High-performance Bus (AHB), and the peripheral bus 138 may include an Advanced Peripheral Bus (APB). Additionally, in some embodiments, any device described above may be coupled to either of the system bus 132 or the peripheral bus 138, depending on the various characteristics (such as bandwidth requirements, latency requirements, and/or the like) of the device. For example, multi-media card controllers may be coupled to the peripheral bus 138.

A camera (not shown) may be coupled to the camera processor 120. The camera processor 120 includes an interface, such as a MIPI® camera serial interface (CSI). The camera processor 120 may further include an encoder preprocessor (EPP) and an image signal processor (ISP) configured to process images received from the camera. The camera processor 120 may further be configured to forward processed and/or unprocessed images to the display controller 111 via the system bus 132.

In some embodiments, GPU 112 is part of a graphics subsystem that renders pixels for a display device 110 that may be any conventional cathode ray tube, liquid crystal display, light-emitting diode display, and/or the like. In such embodiments, the GPU 112 and/or the display controller 111 incorporate circuitry optimized for graphics and video processing, including, for example, video output circuitry such as a high-definition multimedia interface (HDMI) controller, a MIPI® display serial interface (DSI) controller, a display port controller, and/or the like. In some embodiments, the GPU 112 incorporates circuitry optimized for general purpose and/or compute processing. Such circuitry may be incorporated across one or more general processing clusters (GPCs) included within GPU 112 that are configured to perform such general purpose and/or compute operations. The system memory 104 includes at least one device driver 103 configured to manage the processing operations of the GPU 112.

In various embodiments, the GPU 112 may be integrated with one or more of the other elements of FIG. 1 to form a single hardware block For example, the GPU 112 may be integrated with the display controller 111, the camera processor 120, the video encoder/decoder 122, the audio device 126, and/or other connection circuitry included in the computer system 100.

In addition, the system memory 104 includes, without limitation, a wireless test application 144. The wireless test application 144, when executed by one or more processors, performs one or more operations for testing interference on a wireless communications channel, as further described herein. More particularly, the wireless controller(s) 140 may execute the wireless test application 144 to perform one or more of the techniques described herein. Additionally or alternatively, the wireless interface(s) 142, the CPU(s) 102 and/or the GPU(s) 112 may execute the wireless test application 144 to perform one or more of the techniques described herein. When performing the operations associated with testing interference on a wireless communications channel, the wireless test application 144 may store data in and retrieve data from the storage device 114.

In operation, the wireless test application 144 tests a cable associated with a wired communications cable while the cable is installed in the computer system 100. The test determines whether the cable is generating radiated emissions, also referred to herein as noise, that interferes with communications on a wireless communications channel. Such interference may reduce the performance of the wireless communications channel.

The wireless test application 144 selects a wired interface and a wireless interface for measuring noise on the wireless communications channel. The noise on the wireless communications channel is in the form of radiated emissions from a cable associated with the wired interface. The wired interface may be associated with a cable, such as an HDMI cable, a USB cable, a display port cable, and/or the like. The format of the signal transmitted by the cable may be in any technically feasible format, such as 1080p video, 1080i video, 720p video, 4 k HD video, 8 k HD video, USB 3.1, and/or the like. The wireless interface may be compatible with 5 GHz WiFi, 2.4 GHz WiFi, Bluetooth, mobile broadband, and/or the like.

The wireless test application 144 determines a frequency and a bandwidth for measuring the effect on a wireless communications channel of a cable associated with a wired communications channel. In some embodiments, the wireless test application 144 performs a table lookup, where the wireless test application 144 selects a table entry in the table based on a frequency associated with the wired interface. The table entry includes a corresponding test frequency that may be the frequency associated with the wired interface or a harmonic of that frequency. The table entry further includes a bandwidth to test, where the bandwidth represents a frequency range that includes the test frequency.

Then, the wireless test application 144 disables the selected wired interface. As a result, no signals are transmitted via the cable associated with the selected wired interface. The wireless test application 144 disables the selected wired interface in order to measure the noise floor without any emitted radiation from the cable associated with the selected wired interface. The wireless test application 144 sets the wireless interface(s) 142 to monitoring mode. When in monitoring mode, the wireless interface(s) 142 do not transmit extracted data to the wireless controller(s) 140. Instead, the wireless interface(s) 142 transmit digital samples of the received wireless signal. In some embodiments, the digital samples are in the form of quadrature signal samples, including in-phase (I) samples and quadrature (Q) waveform samples.

The wireless test application 144 collects waveform samples via the wireless interface(s) 142. The wireless test application 144 determines the fast Fourier transform (FFT) of the waveform samples to generate a frequency spectrum. The wireless test application 144 repeats the process of collecting waveform samples and determining the FFT of the waveform samples for a predetermined number of sample passes. The number of sample passes is large enough to generate sufficient confidence that the frequency spectrum includes actual noise signals representing the noise floor rather than transient noise that occurs for a brief period of time. Further, the number of sample passes is small enough to allow completion of the test in a relatively short amount of time. The number of passes may be 5 passes, 10 passes, and/or the like. The wireless test application 144 then determines the noise floor based on the average of the completed sample passes. The wireless test application 144 determines whether the noise floor is within the expected range. The expected range may be based on characteristics of one or both of the wired interface and the wireless interface. If the noise floor is not within the expected range, then the wireless test application 144 repeats the process of determining the noise floors, potentially with a different frequency and a bandwidth for measuring the effect on a wireless communications channel of a cable associated with a wired communications channel.

Once the noise floor is within the expected range, the wireless test application 144 enables the selected wired interface. As a result, signals are transmitted via the cable associated with the selected wired interface. The wireless test application 144 enables the selected wired interface in order to measure the noise floor plus any emitted radiation from the cable associated with the selected wired interface. The wireless test application 144 collects waveform samples via the wireless interface(s) 142. The wireless test application 144 determines the FFT of the waveform samples to generate a frequency spectrum. The wireless test application 144 repeats the process of collecting waveform samples and determining the FFT of the waveform samples for a predetermined number of sample passes. The number of sample passes is large enough to generate sufficient confidence that the frequency spectrum includes actual noise signals from a poor-quality cable rather than transient noise that occurs for a brief period of time. Further, the number of sample passes is small enough to allow completion of the test in a relatively short amount of time. The number of passes may be 5 passes, 10 passes, and/or the like. The wireless test application 144 determines the noise power based on the average of the completed sample passes.

The wireless test application 144 compares the noise power with the noise floor. The wireless test application 144 determines whether the noise power exceeds the noise floor. In some embodiments, the wireless test application 144 determines whether the noise power exceeds the noise floor by at least a threshold amount. If the noise power does not exceed the noise floor, then the wireless test application 144 generates an output indicating that the cable passed the test. The output may be directed to a user of the computer system 100, such as a text message, an audible message, a visual icon, and/or the like.

If the noise power exceeds the noise floor, then the wireless test application 144 generates an output indicating that the cable failed the test. The output may be directed to a user of the computer system 100, such as a text message, an audible message, a visual icon, and/or the like. The wireless test application 144 further generates an output indicating one or more corrective actions that the user of the computer system 100 may perform. The output may direct the user to perform various corrective actions, such as an instruction to replace the cable with a higher quality cable, an instruction to use a different wireless communications channel with a different frequency range, an instruction to change the format of the signals transmitted via the wired interface in order reduce the transmission speed of the wired communications channel, and/or the like.

It will be appreciated that the system shown herein is illustrative and that variations and modifications are possible. The connection topology, including the number and arrangement of buses, the number of CPU(s) 102, and the number of GPU(s) 112, may be modified as desired. For example, the system may implement multiple GPU(s) 112 having different numbers of processing cores, different architectures, and/or different amounts of memory. In implementations where multiple GPU(s) 112 are present, those GPU(s) 112 may be operated in parallel to process data at a higher throughput than is possible with a single GPU 112. Systems incorporating one or more GPU(s) 112 may be implemented in a variety of configurations and form factors, including, without limitation, desktops, laptops, handheld personal computers or other handheld devices, servers, workstations, game consoles, embedded systems, and/or the like. In some embodiments, the CPU(s) 102 may include one or more high-performance cores and one or more low-power cores. In addition, the CPU(s) 102 may include a dedicated boot processor that communicates with internal memory 106 to retrieve and execute boot code when the computer system 100 is powered on or resumed from a low-power mode. The boot processor may also perform low-power audio operations, video processing, math functions, system management operations, and/or the like.

The techniques described herein refer to HDMI signals in 1080 progressive at 59.94 Hz (1080p/59.94 Hz) video mode. However, the techniques may be applied to non-HDMI cable types, such as USB, display port, and/or the like. Further, the techniques may be applied to video formats other than 1080p/59.94 Hz and/or non-video formats, such as 1080p/50 Hz, 1080 interactive (1080i), 720p, 4000 high-definition (4 k HD), 8000 high-definition (8 k HD), USB 3.1, and/or the like. In addition, the techniques described herein refer to the 5 GHz WiFi channel. However, the techniques may be applied to other wireless communications channels, such as the 2.4 GHz WiFi channel, Bluetooth, mobile broadband, and/or the like.

In various embodiments, the computer system 100 may be implemented as a system on chip (SoC). In some embodiments, the CPU(s) 102 may be connected to the system bus 132 and/or the peripheral bus 138 via one or more switches or bridges (not shown). In some embodiments, the system bus 132 and the peripheral bus 138 may be integrated into a single bus instead of existing as one or more discrete buses. Lastly, in certain embodiments, one or more components shown in FIG. 1 may not be present. For example, the I/O controller(s) 124 may be eliminated, and the storage device 114 may be a managed storage device that connects directly to the system bus 132. Again, the foregoing is simply one example modification that may be made to the computer system 100. Other aspects and elements may be added to or removed from the computer system 100 in various implementations, and persons skilled in the art will understand that the description of FIG. 1 is exemplary in nature and is not intended in any way to limit the scope of the embodiments of the present disclosure.

Images generated applying one or more of the techniques disclosed herein may be displayed on a monitor or other display device. In some embodiments, the display device may be coupled directly to the system or processor generating or rendering the images. In some embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, and/or the like) that are physically separate from the server or data center. Hence, the techniques disclosed herein can be applied to enhance the images that are streamed and to enhance services that stream images such as NVIDIA GeForce Now (GFN), Google Stadia, and/or the like.

Figure 2:
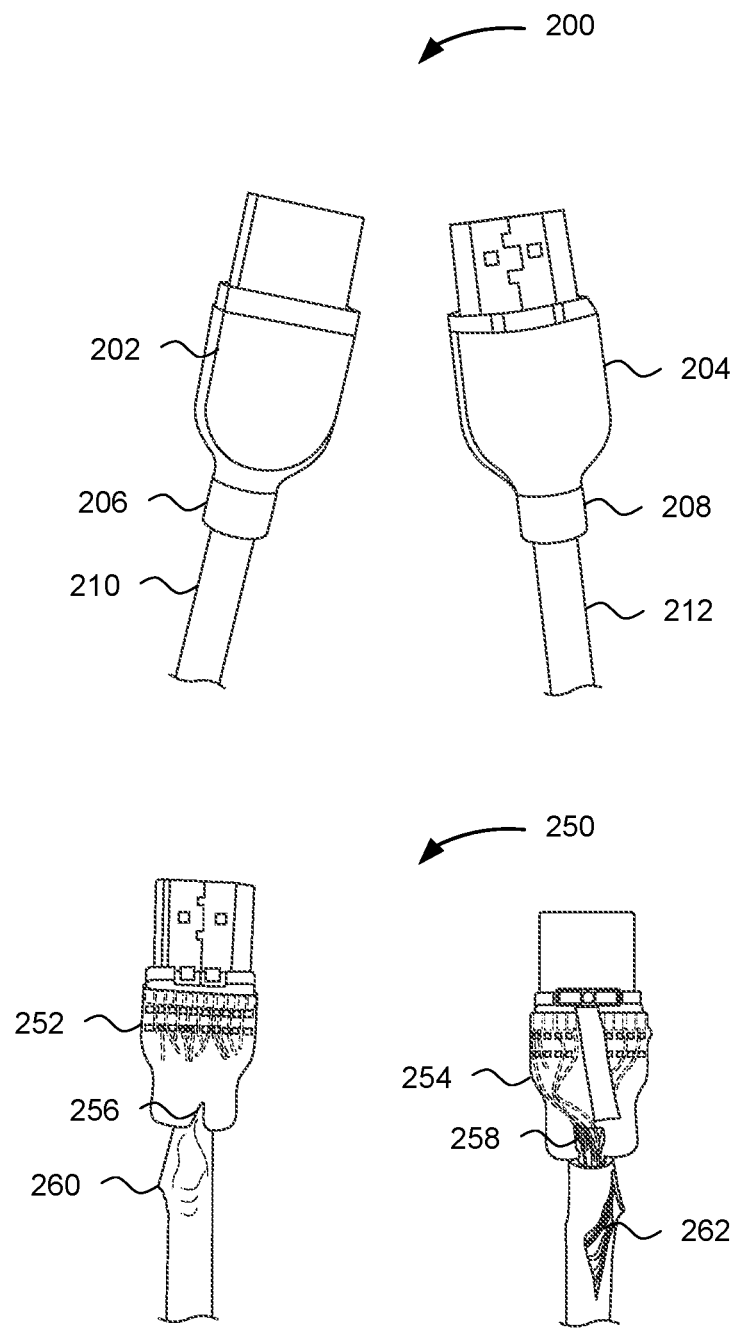
FIG. 2 illustrates a high-quality cable and a low-quality cable deployed in conjunction with the computer system of FIG. 1, according to various embodiments.

Detecting Wireless Communications Interference from a Wired Communications Channel FIG. 2 illustrates a high-quality cable 200 and a low-quality cable 250 deployed in conjunction with the computer system 100 of FIG. 1, according to various embodiments. As shown, the high-quality cable 200 has a connector, where the front side 202 and the rear side 204 of the connector are shielded via a metallic surface, metalized plastic, and/or the like. The cable portion 210 and 212 is also shielded via a metallic foil sheathing, braided metal sheathing, and/or the like. Further, the shielding of the front side 202 and the rear side 204 of the connector are connected to the shielding of the cable portion 210 and 212 via a coupling 206 and 208. No visible damage is apparent to either the front side 202 and the rear side 204 of the connector, the cable portion 210 and 212, or the coupling 206 and 208. Therefore, the signals transmitted along the wires of the high-quality cable 200, such as clock signals, data signals, control signals, and/or the like, are generally retained within the high-quality cable 200. As a result, these signals, cause little to no radiated emissions outside of the high-quality cable 200 that may interfere with wireless communications channels.

By contrast, the low-quality cable 250 has a connector, where the front side 252 and the rear side 254 of the connector are unshielded, such as a clear plastic connector or other non-metalized connector. The front side 252 of the connector includes a damaged portion 256. The rear side 254 of the connector likewise includes a damaged portion 258 where the internal wires of the low-quality cable 250 are exposed. The cable portion of the low-quality cable 250 may be shielded or unshielded. As shown, the cable portion of the low-quality cable 250 includes a damaged section 260, where any shielding in the cable portion may be compromised. Further, the cable portion of the cable portion of the low-quality cable 250 includes a torn section 262, where the shielding and internal wires of the low-quality cable 250 are exposed. The low-quality cable 250 does not include any coupling between the connector and the cable portion. As a result, the signals transmitted along the wires of the high-quality cable 200, such as clock signals, data signals, control signals, and/or the like, may generate radiated emissions outside of the low-quality cable 250 that may interfere with wireless communications channels.

A user of a system, such as the computer system 100 of FIG. 1, may be unable to determine whether a high-quality cable 200 or a low-quality cable 250 is installed. Further, whether a high-quality cable 200 or a low-quality cable 250 is installed, the user may be unable to tell if the cable is generating emitted radiation that is causing performance degradation in one or more wireless communications channels.

Instead, the user may experience degraded performance on one or more wireless communications channels without knowing the root cause of the performance degradation. Via the techniques described herein, the computer system 100 may perform a test to determine if a high-quality cable 200 is installed, resulting in little to no emitted radiation interfering with one or more wireless communications channels. Likewise, the computer system 100 may perform the test to determine if a low-quality cable 250 is installed, resulting in emitted radiation that interferes with one or more wireless communications channels.

Figure 3:
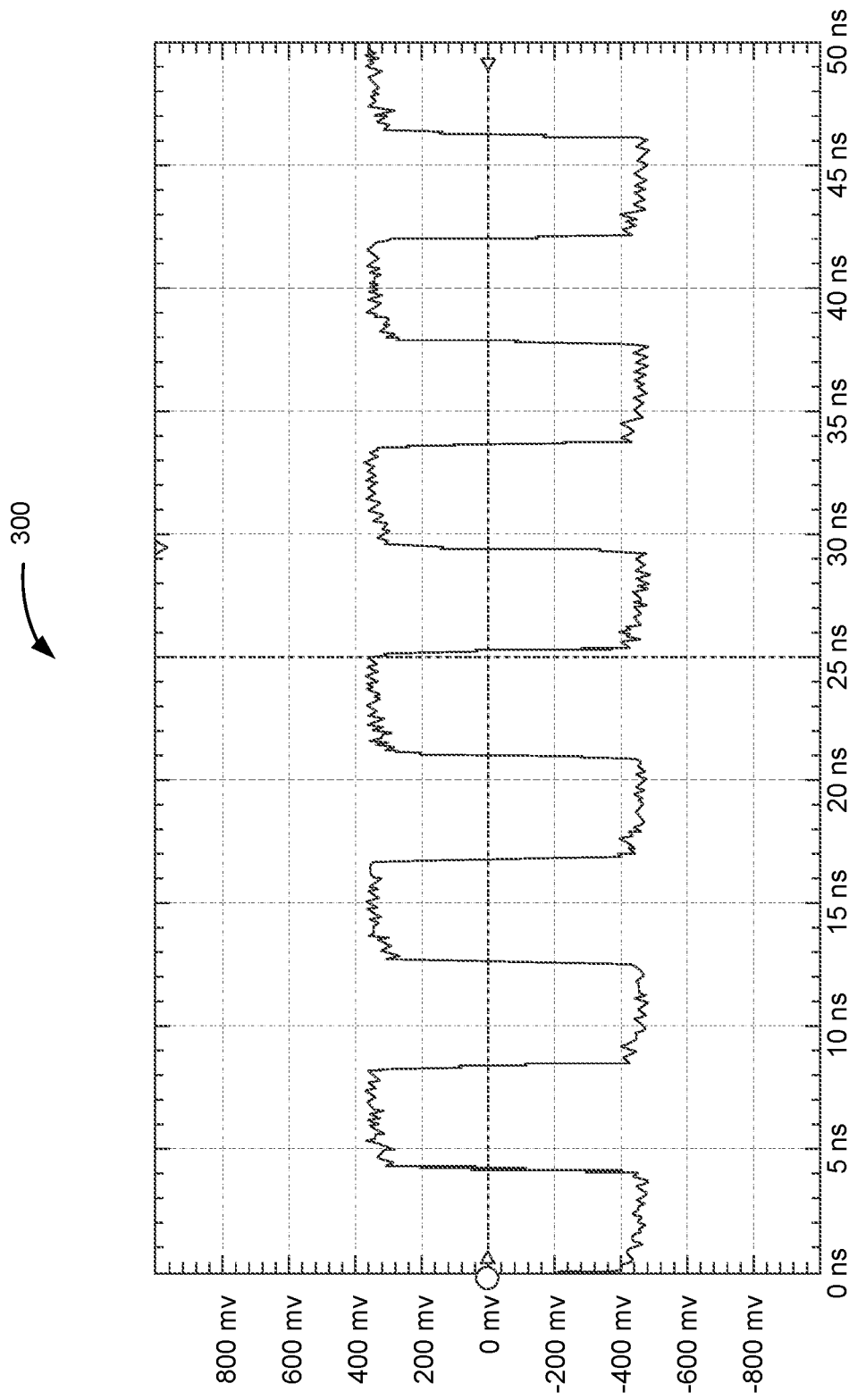
FIG. 3 illustrates a waveform of a typical signal transmitted via either the high-quality cable or the low-quality cable of FIG. 2, according to various embodiments.

FIG. 3 illustrates a waveform 300 of a typical signal transmitted via either the high-quality cable 200 or the low-quality cable 250 of FIG. 2, according to various embodiments. As shown, the waveform 300 has a cycle period of approximately 6.73 nanoseconds (ns). Therefore, the waveform 300 has a frequency of approximately 1÷6.73 ns=148.5 MHz. The waveform 300 has a peak-to-peak amplitude of approximately 800 mV. The waveform 300 is typical of a clock signal transmitted via a wire in an HDMI cable in 1080p/59.94 Hz video mode. If the clock signal is transmitted via a high-quality cable 200, then the clock signal is retained within the high-quality cable 200, resulting in little to no radiated emissions outside of the high-quality cable 200 that may interfere with wireless communications channels. If, however, the clock signal is transmitted via a low-quality cable 250, then the clock signal may generate emitted radiation outside of the low-quality cable 250, resulting in radiated emissions outside of the low-quality cable 250 that may interfere with wireless communications channels.

In addition to the clock signal, the HDMI cable transmits multiple data signals via the wires of the cable. If one or more data signals also have a frequency of approximately 148.5 MHz, then the clock and data signals may have an additive effect. As a result, the radiated emissions outside of the low-quality cable 250 caused by the clock and data signals may be greater than the radiated emissions caused by the clock signal alone.

The waveform 300 may cause radiated emissions at the fundamental frequency of 148.5 MHz. Therefore, the performance of a wireless communications channel in the range of 148.5 MHz may be degraded due to the radiated emissions. Additionally or alternatively, the waveform 300 may cause radiated emissions at one or more harmonics of 148.5 MHz, where a harmonic is an integer multiple of the fundamental frequency. For example, the 35th harmonic of 148.5 MHz is 35×148.5 MHz=5197.5 MHz, which lies within the 5170.0 to 5250.0 MHz WiFi band, also referred to herein as the 5 GHz WiFi band. As a result, radiation at the 35th harmonic of the waveform 300 may cause radiated emissions that degrades the performance of the 5 GHz WiFi band.

Figure 4:
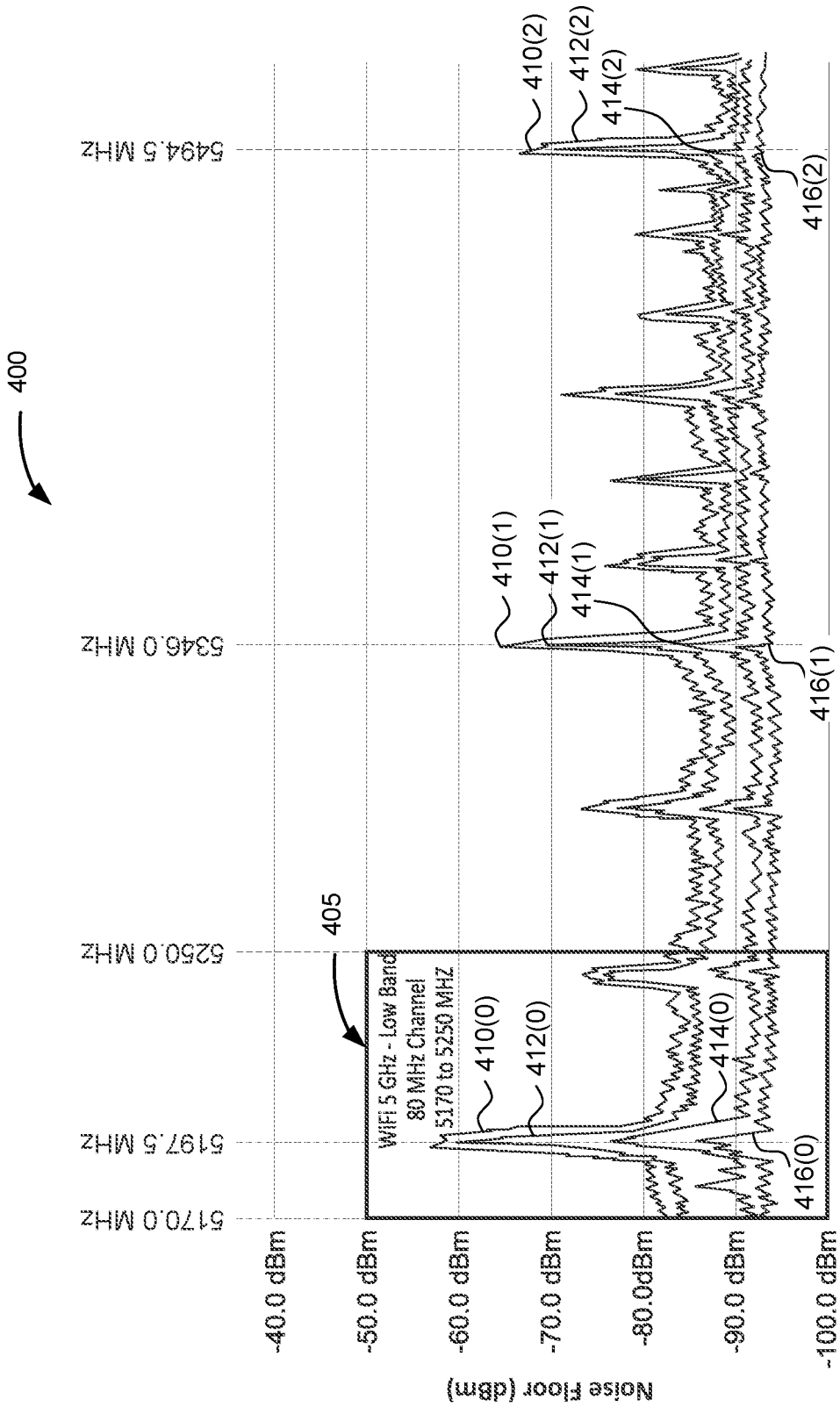
FIG. 4 illustrates waveforms of interference signals from four typical cables, such as the high-quality cable or the low-quality cable of FIG. 2, according to various embodiments.

FIG. 4 illustrates waveforms 400 of interference signals from four typical cables, such as the high-quality cable 200 or the low-quality cable 250 of FIG. 2, according to various embodiments. As shown, the waveforms 400 include a higher than typical amplitude at 410(0) at the frequency of 5197.5 MHz, which is the 35th harmonic of 148.5 MHz. The typical amplitude of the waveform is referred to herein as the noise floor of the waveform. In general, the noise floor is a measure of the cumulative effect of the amplitude of all noise sources and other unwanted signals in the environment, not including the signal being measured. In the disclosed techniques, the noise floor is exclusive of the noise source under test, namely, the radiated emissions from a cable associated with a particular wired communications channel. The amplitude at 410(0) represents radiated emissions generated by a low-quality cable, such as the low-quality cable 250 of FIG. 2. This higher than average amplitude at 410(0) lies within the 5 GHz WiFi band 405, which ranges from 5170.0 MHz to 5250.0 MHz. The amplitude at 412(0) is less than the amplitude at 410(0), representing radiated emissions generated by a cable that is somewhat better than the cable that generated the amplitude at 410(0). Even so, the amplitude at 412(0) is also significantly higher than the noise floor. As a result, the cables that generated the amplitudes at 410(0) and at 412(0) generate radiated emissions that may significantly interfere with the 5 GHz WiFi band 405.

The amplitude at 414(0) is less than the amplitudes at 410(0) and 412(0), representing radiated emissions generated by a cable that is better than the cables that generated the amplitudes at 410(0) and 412(0). However, the amplitude at 414(0) is also significantly higher than the noise floor. As a result, the cable that generated the amplitude at 414(0) generates radiated emissions that may moderately interfere with the 5 GHz WiFi band 405. The amplitude at 416(0) is less than the amplitudes at 410(0), 412(0), and 414(0), representing radiated emissions generated by a cable that is significantly better than the cables that generated the amplitudes at 410(0), 412(0), and 414(0). The amplitude at 416(0) represents radiated emissions generated by a high-quality cable, such as the high-quality cable 200 of FIG. 2. The amplitude at 416(0) is relatively close to the noise floor. As a result, the cable that generated the amplitude at 416(0) generates little to no radiated emissions and, therefore, generates little to no interference with the 5 GHz WiFi band 405. Because any of the cables that generated the waveforms 400 may be installed in the system, the wireless test application 144 measures the emitted radiation to determine the level of interference in the 5 GHz WiFi band 405 caused by the installed cable.

As shown, the waveforms 400 also include a higher than typical amplitude at 36×148.5 MHz=5346.0 MHz, which is the 36th harmonic of 148.5 MHz. Typically, the amplitude of the radiated emissions decreases as the number of the harmonic decreases. As a result, the amplitudes at 410(1), 412(1), 414(1), and 416(1) are less than the amplitudes at 410(0), 412(0), 414(0), and 416(0), respectively. Similarly, the waveforms 400 include a higher than typical amplitude at 37×148.5 MHz=5494.5 MHz, which is the 37th harmonic of 148.5 MHz. The amplitudes at 410(2), 412(2), 414(2), and 416(2) are less than the amplitudes at 410(1), 412(1), 414(1), and 416(1), respectively. As further discussed herein, the wireless test application 144 may advantageously measure radiated emissions at a harmonic that is not within a wireless communications channel, such as the 5 GHz WiFi band 405. As a result, the wireless test application 144 may measure radiated emissions at the 36th harmonic, the 37th harmonic, or some other harmonic rather than at the 35th harmonic. The change in amplitude from the 35th harmonic to the 36th harmonic is predictable. Likewise, the change in amplitude from the 36th harmonic to the 37th harmonic is predictable. In some embodiments, the amplitude of a particular harmonic may be predicted based on the rise and fall characteristics of the driving source. By analyzing the rise and fall characteristics of the driving source, the wireless test application 144 may infer the relative levels of the 35th harmonic, the 36th harmonic, and/or other harmonics. In general, the relative levels of the 35th harmonic, the 36th harmonic, and/or other harmonics are likely to remain constant for a given processor, computer system, product, and/or the like. Therefore, the wireless test application 144 may measure radiated emissions at the 36th harmonic, the 37th harmonic, or some other harmonic and compute the predicted value at the 35th harmonic.

Figure 5:
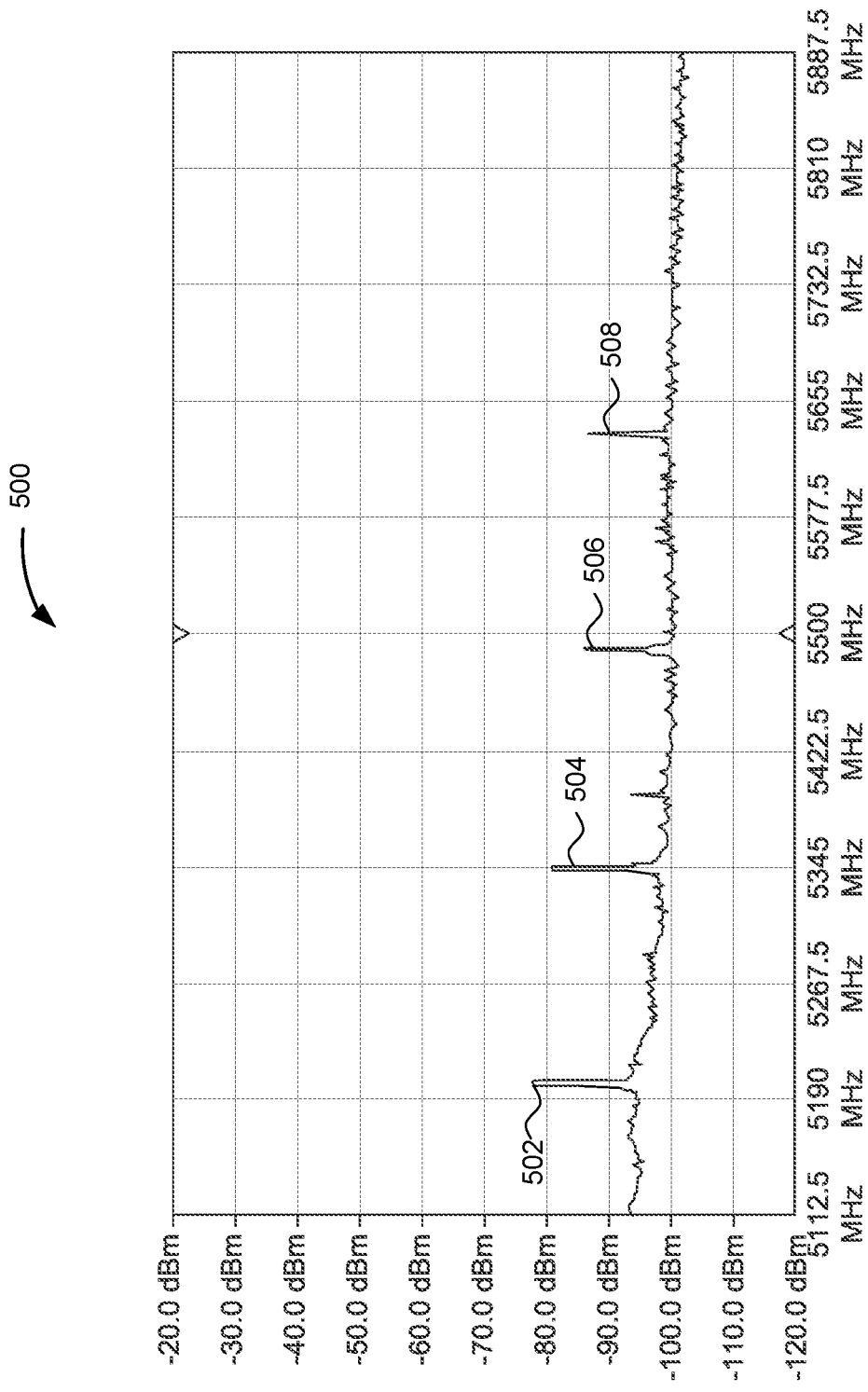
FIG. 5 illustrates a waveform of an interference signal from the low-quality cable of FIG. 2 within an environment that does not include other wireless devices, according to various embodiments.

FIG. 5 illustrates a waveform 500 of an interference signal from the low-quality cable 250 of FIG. 2 within an environment that does not include other wireless devices, according to various embodiments. As shown, the waveform includes amplitudes above the noise floor at 502, 504, 506, and 508. The amplitude at 502 is the 35th harmonic of 148.5 MHz, which is 35×148.5 MHz=5197.5 MHz. Even though the amplitude at 502 is within the 5 GHz WiFi band, no other signal is present in the band, because the environment does not include other wireless devices. Therefore, the wireless test application 144 may test for interference at the 35th harmonic to determine that the amplitude at 502 is due to radiated emissions from a low-quality HDMI cable, such as the low-quality cable 250 of FIG. 2. Likewise, the amplitudes at 504, 506, and 508 are at the 36th, 37th, and 38th harmonic, respectively, of 148.5 MHz, which is 5346.0 MHz, 5494.5 MHz, and 5646.0 MHz, respectively. Again, no other signals are present because the environment does not include other wireless devices. Therefore, the wireless test application 144 may test for interference at the 36th, 37th, and/or 38th harmonic to determine that the amplitudes at 504, 506, and 508, respectively, are due to radiated emissions from a low-quality HDMI cable, such as the low-quality cable 250 of FIG. 2.

Figure 6:
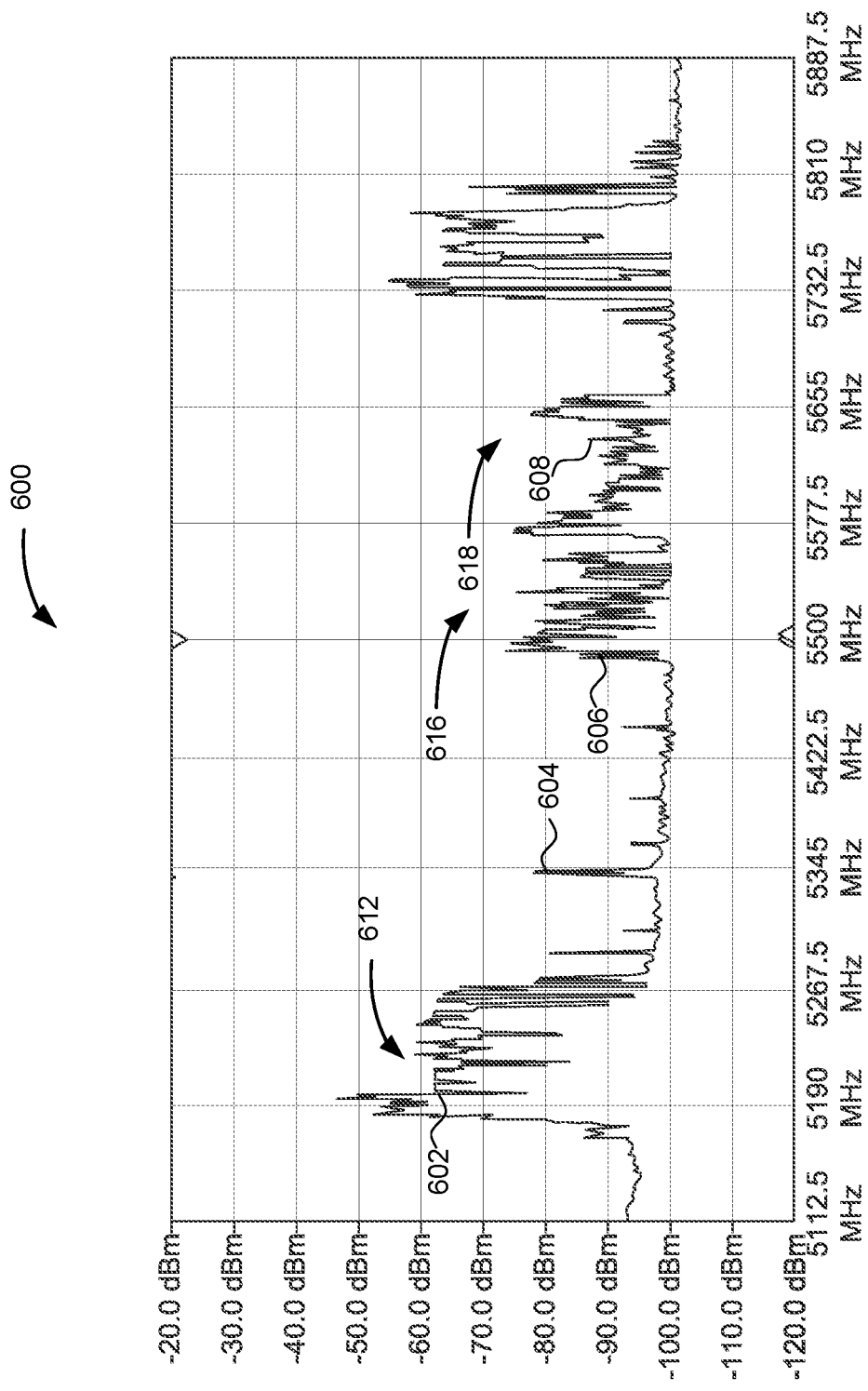
FIG. 6 illustrates a waveform of an interference signal from the low-quality cable of FIG. 2 within an environment that includes other wireless devices, according to various embodiments.

FIG. 6 illustrates a waveform 600 of an interference signal from the low-quality cable 250 of FIG. 2 within an environment that includes other wireless devices, according to various embodiments. As shown, the waveform 600 includes an amplitude above the noise floor at 602 at the 35th harmonic of 148.5 MHz, which is 35×148.5 MHz=5197.5 MHz. In addition, other WiFi devices, access points, and/or noise sources are transmitting in the 5 GHz WiFi band, resulting in the amplitudes at region 612. As a result, the wireless test application 144 may be unable to differentiate between radiated emissions from a low-quality cable and signals transmitted by wireless devices, access points, and/or other noise sources in the 5 GHz WiFi band.

Similarly, the waveform 600 includes an amplitude above the noise floor at 606 at the 37th harmonic of 148.5 MHz and at 608 at the 38th harmonic of 148.5 MHz. Again, other wireless devices, access points, and/or other noise sources are transmitting in the same frequency bands as the 37th harmonic and at 608 the 38th harmonic, resulting in the amplitudes at regions 616 and 618, respectively. As a result, the wireless test application 144 may be unable to differentiate between radiated emissions from a low-quality cable and signals transmitted by wireless devices, access points, and/or other noise sources in regions 616 and 618. Further, the waveform 600 includes an amplitude above the noise floor at 604 at the 36th harmonic of 148.5 MHz, which is 36×148.5 MHz=5346.0 MHz. However, no other wireless devices, access points, and/or noise sources are transmitting in the same frequency band in the region of the amplitude at 604. Therefore, the wireless test application 144 may test for interference at the 36th harmonic to determine that the amplitudes at 604 is due to radiated emissions from a low-quality HDMI cable, such as the low-quality cable 250 of FIG. 2.

Figure 7A:
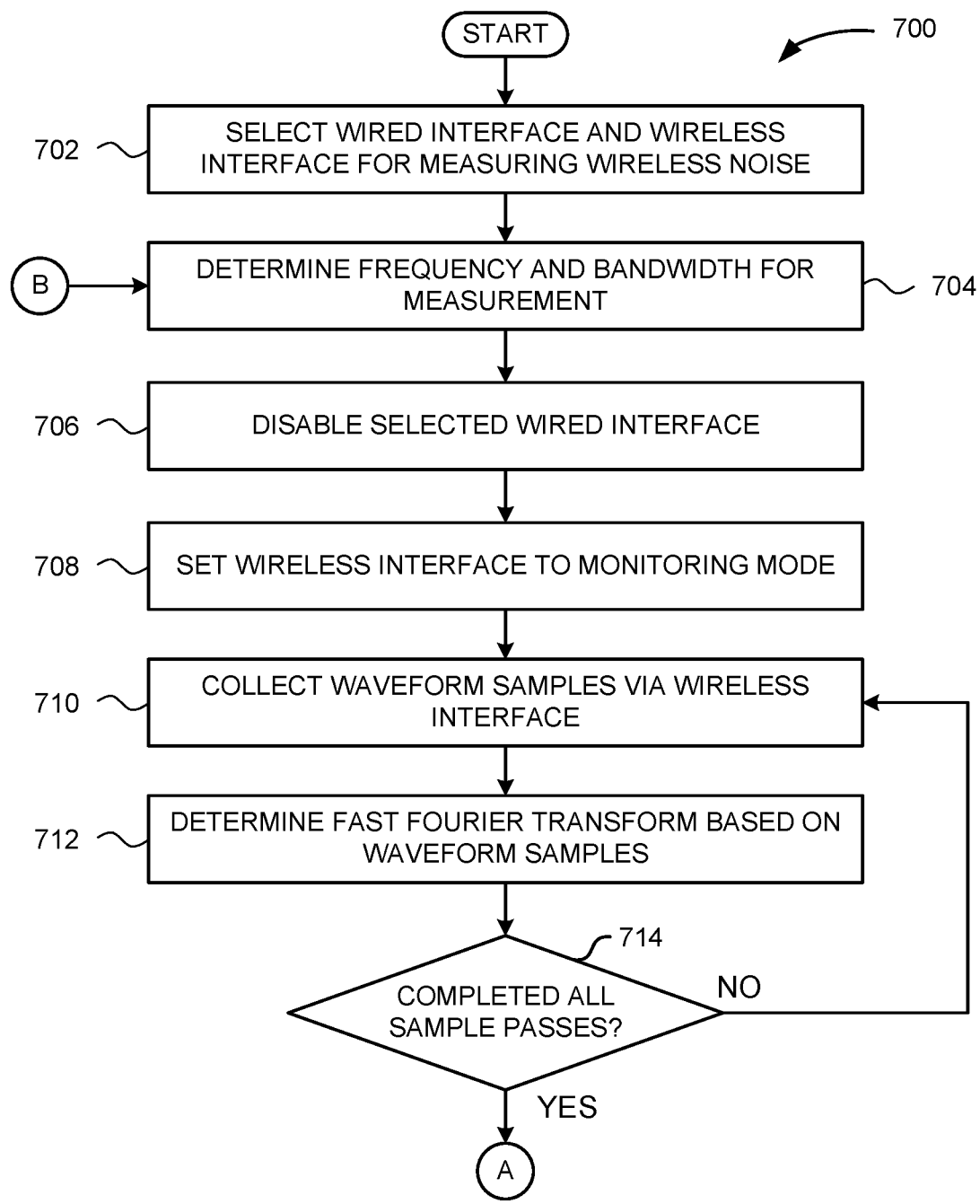
FIGS. 7A-7C set forth a flow diagram of method steps for detecting wireless communications interference from a wired communications channel via the computer system of FIG. 1, according to various embodiments.
Figure 7B:
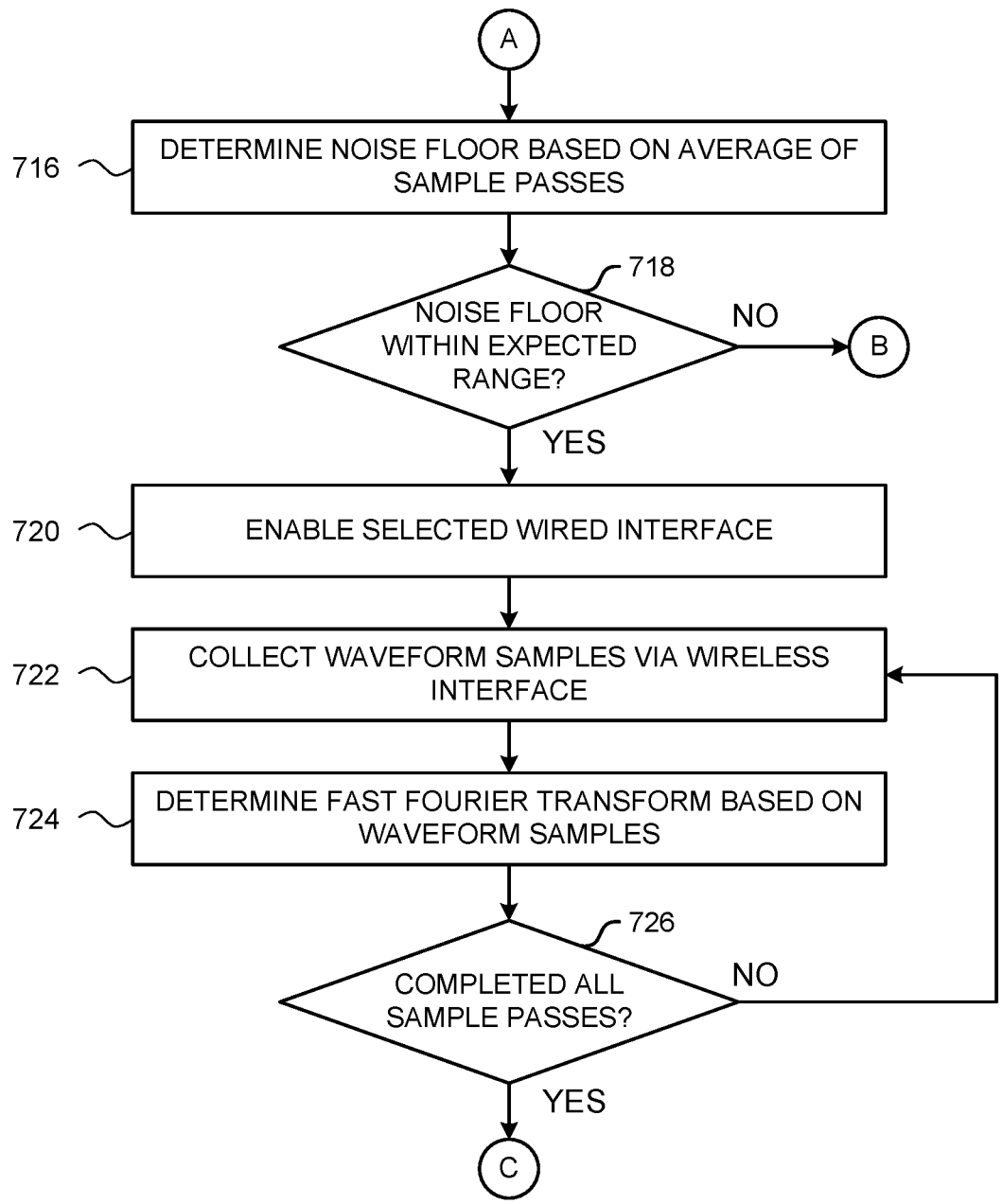
Figure 7C:
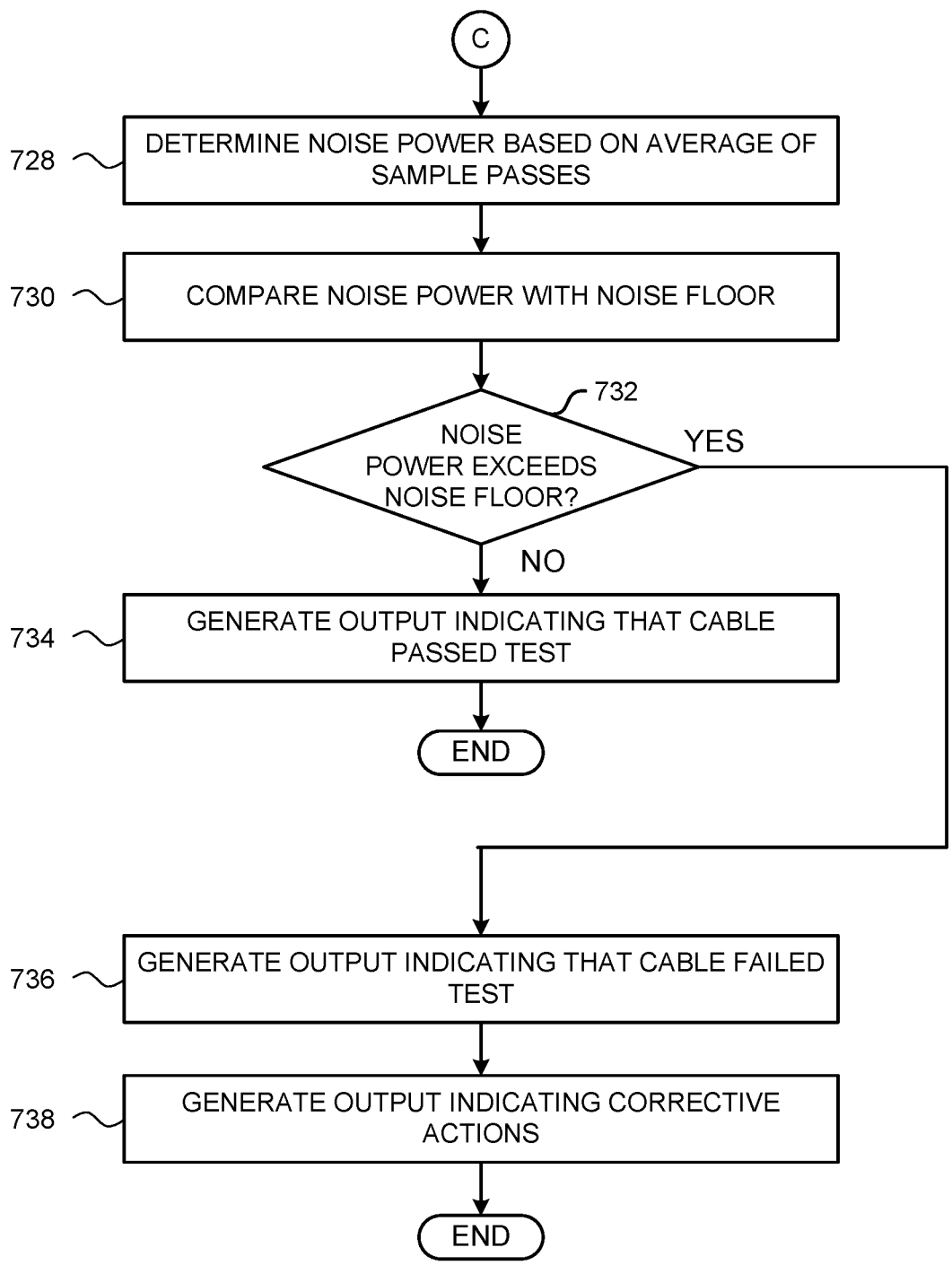

FIGS. 7A-7C set forth a flow diagram of method steps for detecting wireless communications interference from a wired communications channel via the computer system of FIG. 1, according to various embodiments. Although the method steps are described in conjunction with the systems of FIGS. 1-6, persons of ordinary skill in the art will understand that any system configured to perform the method steps, in any order, is within the scope of the present disclosure.

As shown, a method 700 begins at step 702, where a wireless test application 144, executed by one or more processors, selects a wired interface and a wireless interface for measuring noise on the wireless communications channel. The wireless test application 144 may be executed by the wireless controller(s) 140, the wireless interface(s) 142, the CPU(s) 102, the GPU(s) 112, and/or the like. The noise on the wireless communications channel is in the form of radiated emissions from a cable associated with the wired interface. The wired interface may be associated with a cable, such as an HDMI cable, a USB cable, a display port cable, and/or the like. The format of the signal transmitted by the cable may be in any technically feasible format, such as 1080p video, 1080i video, 720p video, 4 k HD video, 8 k HD video, USB 3.1, and/or the like. The wireless interface may be compatible with 5 GHz WiFi, 2.4 GHz WiFi, Bluetooth, mobile broadband, and/or the like.

At step 704, the wireless test application 144 determines a frequency and a bandwidth for measuring the effect on a wireless communications channel of a cable associated with a wired communications channel. In some embodiments, the wireless test application 144 performs a table lookup, where the wireless test application 144 selects a table entry in the table based on a frequency associated with the wired interface. The table entry includes a corresponding test frequency that may be the frequency associated with the wired interface or a harmonic of that frequency. The table entry further includes a bandwidth to test, where the bandwidth represents a frequency range that includes the test frequency.

At step 706, the wireless test application 144 disables the selected wired interface. As a result, no signals are transmitted via the cable associated with the selected wired interface. The wireless test application 144 disables the selected wired interface in order to measure the noise floor without any emitted radiation from the cable associated with the selected wired interface. At step 708, the wireless test application 144 sets the wireless interface(s) 142 to monitoring mode. When in monitoring mode, the wireless interface(s) 142 do not transmit extracted data to the wireless controller(s) 140. Instead, the wireless interface(s) 142 transmit digital samples of the received wireless signal. In some embodiments, the digital samples are in the form of quadrature signal samples, including in-phase (I) samples and quadrature (Q) waveform samples.

At step 710, the wireless test application 144 collects waveform samples via the wireless interface(s) 142. At step 712, the wireless test application 144 determines the fast Fourier transform (FFT) of the waveform samples to generate a frequency spectrum. At step 714, the wireless test application 144 determines whether all sample passes are completed. The number of sample passes is large enough to generate sufficient confidence that the frequency spectrum includes actual noise signals representing the noise floor rather than transient noise that occurs for a brief period of time. Further, the number of sample passes is small enough to allow completion of the test in a relatively short amount of time. The number of passes may be 5 passes, 10 passes, and/or the like. If all sample passes are not completed, then the method 700 proceeds to step 710, described above.

If, however, all sample passes are completed, then the method 700 proceeds to step 716, where the wireless test application 144 determines the noise floor based on the average of the completed sample passes. At step 718, the wireless test application 144 determines whether the noise floor is within the expected range. The expected range may be based on characteristics of one or both of the wired interface and the wireless interface. If the noise floor is not within the expected range, then the method 700 proceeds to step 704, described above.

If, however, the noise floor is within the expected range, then the method 700 proceeds to step 720, where the wireless test application 144 enables the selected wired interface. As a result, signals are transmitted via the cable associated with the selected wired interface. The wireless test application 144 enables the selected wired interface in order to measure the noise floor plus any emitted radiation from the cable associated with the selected wired interface. At step 722, the wireless test application 144 collects waveform samples via the wireless interface(s) 142. At step 724, the wireless test application 144 determines the FFT of the waveform samples to generate a frequency spectrum. At step 726, the wireless test application 144 determines whether all sample passes are completed. The number of sample passes is large enough to generate sufficient confidence that the frequency spectrum includes actual noise signals from a poor-quality cable rather than transient noise that occurs for a brief period of time. Further, the number of sample passes is small enough to allow completion of the test in a relatively short amount of time. The number of passes may be 5 passes, 10 passes, and/or the like. If all sample passes are not completed, then the method 700 proceeds to step 722, described above.

If, however, all sample passes are completed, then the method 700 proceeds to step 728, where the wireless test application 144 determines the noise power based on the average of the completed sample passes. At step 730, the wireless test application 144 compares the noise power determined in steps 720 through 728 with the noise floor determined in steps 706 through 716. At step 732, the wireless test application 144 determines whether the noise power exceeds the noise floor. In some embodiments, the wireless test application 144 determines whether the noise power exceeds the noise floor by at least a threshold amount. If the noise power does not exceed the noise floor, then the method 700 proceeds to step 734, where the wireless test application 144 generates an output indicating that the cable passed the test. The output may be directed to a user of the computer system 100, such as a text message, an audible message, a visual icon, and/or the like. The method 700 then terminates.

Returning to step 732, if the noise power exceeds the noise floor, then the method 700 proceeds to step 736, where the wireless test application 144 generates an output indicating that the cable failed the test. The output may be directed to a user of the computer system 100, such as a text message, an audible message, a visual icon, and/or the like. At step 738, the wireless test application 144 generates an output indicating one or more corrective actions that the user of the computer system 100 may perform. The output may direct the user to perform various corrective actions, such as an instruction to replace the cable with a higher quality cable, an instruction to use a different wireless communications channel with a different frequency range, an instruction to change the format of the signals transmitted via the wired interface in order reduce the transmission speed of the wired communications channel, and/or the like. The method 700 then terminates.

In sum, wireless test application executing on one or more processors performs a test to determine whether a cable associated with a wired communications channel is generating radiated emissions that cause interference on a wireless communications channel. The radiated emissions may result from a low-quality cable that may have little or no shielding and/or a cable that has been damaged. The wireless test application performs the test while the cable is installed in the end user system. In a first phase of the test, the wireless test application disables the wired interface in order to measure the noise floor. The wireless test application sets the wireless interface in monitoring mode in order to collect digitized waveform samples from the wireless communications channel. The wireless test application then collects waveform samples over a specified frequency range and converts the waveform samples in the time domain into a frequency spectrum in the frequency domain. The wireless test application repeats the collection of samples and conversion to a frequency spectrum for a predetermined number of passes. The wireless test application then determines the noise floor based on an average of the several passes.

In a second phase of the test, the wireless test application enables the wired interface in order to measure the noise power, including the noise floor plus the radiated emission from the cable. The wireless test application then collects waveform samples over the specified frequency range and converts the waveform samples in the time domain into a frequency spectrum in the frequency domain. The wireless test application repeats the collection of samples and conversion to a frequency spectrum for a predetermined number of passes. The wireless test application then determines the noise power based on an average of the several passes. If the noise power does not exceed the noise floor by more than a threshold amount, then the wireless test application determines that the cable passed the test. If, however, the noise power exceeds the noise floor by more than the threshold amount, then the wireless test application determines that the cable failed the test.

At least one technical advantage of the disclosed techniques relative to the prior art is that, with the disclosed techniques, a cable can be tested at the point of use without destroying the cable. In addition, a cable can be tested without the use of expensive, specialized test equipment and without needing special training or skills in the operation of such test equipment. Instead, an unsophisticated user can test a cable by executing a simple test process while the cable is installed. As a result, a user can readily identify whether a cable is causing interference with a wireless communications channel and, in response, take appropriate action. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, and/or the like) or an embodiment combining software and hardware aspects that may all generally be referred to herein as a module or system. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for detecting wireless communications interference from a wired communications channel, the method comprising:
   determining a noise floor associated with a wireless communications channel;
   determining a noise power based on radiated emissions from the wired communications channel that interfere with the wireless communications channel;
   comparing the noise power with the noise floor to generate a comparison; and
   classifying a cable associated with the wired communications channel based on the comparison.

2. The computer-implemented method of claim 1, wherein determining the noise floor comprises:
   disabling the wired communications channel from transmitting data;
   collecting a first set of waveform samples via a wireless interface associated with the wireless communications channel; and
   generating a first frequency spectrum based on the first set of waveform samples,
   wherein the noise power is based on the first frequency spectrum.

3. The computer-implemented method of claim 2, wherein determining the noise floor further comprises:
   collecting a second set of waveform samples via the wireless interface; and
   generating a second frequency spectrum based on the second set of waveform samples,
   wherein the noise power is further based on the second frequency spectrum.

4. The computer-implemented method of claim 2, wherein determining the noise floor further comprises setting the wireless interface to a monitoring mode, wherein, when in the monitoring mode, the wireless interface is configured to generate the first set of waveform samples.

5. The computer-implemented method of claim 1, wherein determining the noise power comprises:
   enabling the wired communications channel to transmit data;
   collecting a first set of waveform samples via a wireless interface associated with the wireless communications channel; and
   generating a first frequency spectrum based on the first set of waveform samples,
   wherein the noise power is based on the first frequency spectrum.

6. The computer-implemented method of claim 5, wherein determining the noise power further comprises:
   collecting a second set of waveform samples via the wireless interface; and
   generating a second frequency spectrum based on the second set of waveform samples,
   wherein the noise power is further based on the second frequency spectrum.

7. The computer-implemented method of claim 1, wherein classifying the cable comprises:
   determining that the noise power exceeds the noise floor by at least a threshold amount; and
   classifying the cable as a low-quality cable.

8. The computer-implemented method of claim 1, wherein classifying the cable comprises:
   determining that the noise power does not exceed the noise floor by at least a threshold amount; and
   classifying the cable as a high-quality cable.

9. One or more non-transitory computer-readable media storing program instructions that, when executed by one or more processors, cause the one or more processors to perform one or more steps, comprising:
   determining a noise floor associated with a wireless communications channel;
   determining a noise power based on radiated emissions from a wired communications channel that interfere with the wireless communications channel;
   comparing the noise power with the noise floor to generate a comparison; and
   classifying a cable associated with the wired communications channel based on the comparison.

10. The one or more non-transitory computer-readable media of claim 9, wherein determining the noise floor comprises:
    disabling the wired communications channel from transmitting data;
    collecting a first set of waveform samples via a wireless interface associated with the wireless communications channel; and
    generating a first frequency spectrum based on the first set of waveform samples,
    wherein the noise power is based on the first frequency spectrum.

11. The one or more non-transitory computer-readable media of claim 10, wherein determining the noise floor further comprises:
    collecting a second set of waveform samples via the wireless interface; and
    generating a second frequency spectrum based on the second set of waveform samples,
    wherein the noise power is further based on the second frequency spectrum.

12. The one or more non-transitory computer-readable media of claim 10, wherein determining the noise floor further comprises setting the wireless interface to a monitoring mode, wherein, when in the monitoring mode, the wireless interface is configured to generate the first set of waveform samples.

13. The one or more non-transitory computer-readable media of claim 9, wherein determining the noise power comprises:
    enabling the wired communications channel to transmit data;
    collecting a first set of waveform samples via a wireless interface associated with the wireless communications channel; and
    generating a first frequency spectrum based on the first set of waveform samples,
    wherein the noise power is based on the first frequency spectrum.

14. The one or more non-transitory computer-readable media of claim 13, wherein determining the noise power further comprises:
    collecting a second set of waveform samples via the wireless interface; and
    generating a second frequency spectrum based on the second set of waveform samples,
    wherein the noise power is further based on the second frequency spectrum.

15. The one or more non-transitory computer-readable media of claim 9, wherein the cable comprises at least one of a high-definition multimedia interface (HDMI) cable, a Universal Serial Bus (USB) cable, or a display port cable.

16. The one or more non-transitory computer-readable media of claim 9, wherein the wireless communications channel comprises at least one of a wireless fidelity (WiFi) channel, a Bluetooth channel, or a mobile broadband channel.

17. A system, comprising:
    a memory storing instructions; and
    a processor that is coupled to the memory and, when executing the instructions:
        determines a noise floor associated with a wireless communications channel;
        determines a noise power based on radiated emissions from a wired communications channel that interfere with the wireless communications channel;
        compares the noise power with the noise floor to generate a comparison; and
        classifies a cable associated with the wired communications channel based on the comparison.

18. The system of claim 17, wherein determining the noise power comprises:
    enabling the wired communications channel to transmit data;
    collecting a first set of waveform samples via a wireless interface associated with the wireless communications channel; and
    generating a first frequency spectrum based on the first set of waveform samples,
    wherein the noise power is based on the first frequency spectrum.

19. The system of claim 18, wherein determining the noise power further comprises:
    collecting a second set of waveform samples via the wireless interface; and
    generating a second frequency spectrum based on the second set of waveform samples,
    wherein the noise power is further based on the second frequency spectrum.

20. The system of claim 18, wherein determining the noise power further comprises setting the wireless interface to a monitoring mode, wherein, when in the monitoring mode, the wireless interface is configured to generate the first set of waveform samples.

* * * * *